(12) United States Patent
Noll (10) Patent No.: US 7,975,458 B1
(45) Date of Patent: Jul. 12, 2011

(54) CONTROL SYSTEM FOR A CROP HARVESTING HEADER

(75) Inventor: Blaine R. Noll, Fleetwood, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/860,952

(22) Filed: Aug. 23, 2010

(51) Int. Cl.
*A01D 41/14* (2006.01)
*A01D 46/08* (2006.01)
*A01D 75/28* (2006.01)

(52) U.S. Cl. .................................... 56/10.2 E

(58) Field of Classification Search ............... 56/10.2 E, 56/208, 214, 10.2 R, DIG. 10; 172/4
See application file for complete search history.

(56) References Cited

U.S. PATENT DOCUMENTS

| | | | |
|---|---|---|---|
| 2,473,655 A | 6/1949 | Lohn | |
| 3,196,599 A | 7/1965 | Meiners et al. | |
| 3,704,574 A | 12/1972 | Gardner | |
| 3,906,710 A | 9/1975 | Pask | |
| 4,211,057 A | 7/1980 | Dougherty et al. | |
| 4,409,778 A * | 10/1983 | McNaught | 56/10.2 A |
| 4,594,840 A * | 6/1986 | D'Almeida et al. | 56/11.2 |
| 4,942,724 A * | 7/1990 | Diekhans et al. | 56/10.4 |
| 5,463,854 A * | 11/1995 | Chmielewski et al. | 56/10.2 E |
| 5,469,694 A * | 11/1995 | Panousheck et al. | 56/10.2 E |
| 5,471,825 A * | 12/1995 | Panoushek et al. | 56/10.2 E |
| 5,473,870 A * | 12/1995 | Panoushek et al. | 56/10.2 E |
| 5,535,577 A * | 7/1996 | Chmielewski et al. | 56/10.2 E |
| 5,577,373 A * | 11/1996 | Panoushek et al. | 56/10.2 E |
| 5,633,452 A * | 5/1997 | Bebernes | 73/37 |
| 5,704,200 A * | 1/1998 | Chmielewski et al. | 56/10.2 E |
| 5,713,190 A * | 2/1998 | Vermeulen et al. | 56/10.2 E |
| 5,937,621 A * | 8/1999 | Eggenhaus | 56/10.2 E |
| 6,289,659 B1 * | 9/2001 | Fox | 56/10.2 E |
| 6,523,333 B2 | 2/2003 | Metzger | |
| 6,530,197 B1 | 3/2003 | Christensen et al. | |
| 6,588,187 B2 * | 7/2003 | Engelstad et al. | 56/10.2 E |
| 6,758,029 B2 * | 7/2004 | Beaujot | 56/10.2 E |
| 6,826,894 B2 * | 12/2004 | Thiemann et al. | 56/10.2 E |
| 6,883,299 B1 * | 4/2005 | Gramm | 56/10.2 E |
| 7,222,474 B2 * | 5/2007 | Rayfield et al. | 56/10.2 E |
| 7,310,931 B2 | 12/2007 | Gramm | |
| 7,430,846 B2 * | 10/2008 | Bomleny et al. | 56/10.2 E |
| 7,555,883 B2 * | 7/2009 | Fackler et al. | 56/10.2 E |
| 7,603,837 B2 * | 10/2009 | Ehrhart et al. | 56/10.2 E |

(Continued)

FOREIGN PATENT DOCUMENTS

WO    WO 8404652 A * 12/1984

*Primary Examiner* — Arpád Fábián Kovács
(74) *Attorney, Agent, or Firm* — Michael G. Harms; Patrick M Sheldrake (57) ABSTRACT

A crop harvesting header for use with a work vehicle includes a shaft extending substantially transverse to a direction of travel of the header, the shaft rotates about its axis in response to a portion of a member contacting a first arm when the header is in the first operating mode. The shaft does not rotate about the shaft axis when the header is in a second operating mode. A second arm rotates about the shaft in response to ground undulations when the header is in the second operating mode. A sensor, operatively connected to the second arm and to a controller, senses when the second arm is located at a predetermined position when the header is in the second operating mode. The sensor communicates with the controller to effect movement of the header with respect to the ground when the header is in the second operating mode.

18 Claims, 5 Drawing Sheets

U.S. PATENT DOCUMENTS

| | | |
|---|---|---|
| 7,647,753 B2 | 1/2010 | Schlipf |
| 7,707,811 B1 * | 5/2010 | Strosser .................... 56/10.2 E |
| 7,730,700 B2 * | 6/2010 | Nathan et al. ............. 56/10.2 E |
| 2002/0069628 A1 * | 6/2002 | Metzger .................... 56/10.2 E |
| 2006/0242935 A1 * | 11/2006 | Rayfield et al. ............ 56/10.2 E |
| 2006/0248868 A1 * | 11/2006 | Otto et al. .................. 56/10.2 E |
| 2007/0068129 A1 * | 3/2007 | Strosser .................... 56/10.2 E |
| 2010/0077712 A1 | 4/2010 | Nathan et al. |

* cited by examiner

CONTROL SYSTEM FOR A CROP HARVESTING HEADER

FIELD OF THE INVENTION

The present invention relates generally to crop harvesting headers for use with crop harvesting devices. It relates more particularly to a system for controlling the position of header when the header utilizes a certain operating mode.

BACKGROUND OF THE INVENTION

The cutting assemblies of the known large headers of plant-cutting machines may be supported by headers utilizing different operating modes, depending upon the crop being harvested. For certain crops, such as wheat or barley, the cutting assembly may be positioned approximately 6 inches above the ground during harvesting, such as by a combine. While harvesting such crops, the combine header may utilize an operating mode commonly referred to as rigid mode, since the cutter assembly would be maintained in a rigid position at all times during harvesting. In contrast, other crops, such as soybeans, require the cutting assembly to be positioned approximately 1-2 inches above the ground during harvesting. While operating the combine header in rigid mode typically maximizes the amount of crop harvested, the combine head is susceptible to damage due to encountering ground undulations in the field. Due to the possibility of such operating conditions, the combine may utilize a flex operating mode, in which individualized arms that support a small portion of the cutter assembly are movable in response to encountering ground undulations. Although utilizing a flex operating mode better protects the cutting assembly, harvesting efficiency may be reduced. However, in conventional combine constructions, by utilizing a rigid operating mode, an operator must manually adjust, typically by raising and tilting the entire header, in order to avoid damage from ground undulations. Requiring manual adjustment places additional burdens on the combine operator, leading to fatigue and other undesirable results.

What is needed is a control system that provides automatic control of the header position (vertical and/or rotational movement of the header) while the header utilizes a rigid operating mode.

SUMMARY OF THE INVENTION

The present invention relates to a crop harvesting header for use with a work vehicle, the header including a first arm pivotably secured to the header and configured to support a cutterbar. The first arm is configured to move in response to encountering ground undulations when the header is in a first operating mode. A shaft has an axis and secured to the header, the shaft including a member outwardly extending from the shaft, the shaft extending substantially transverse to a direction of travel of the header. The shaft is configured to rotate about the axis in response to a portion of the member distal from the shaft being brought into abutting contact with the first arm when the header is in the first operating mode. The shaft is configured not to rotate about the axis when the header is in a second operating mode. A second arm is rotatably movable about the axis of the shaft, a surface of the second arm facing the ground is configured to encounter ground undulations when the header is in the second operating mode. A sensor is operatively connected to the second arm and to a controller, the sensor configured to sense when a position of the second arm is located at a predetermined position that is at least in close proximity of ground undulations when the header is in the second operating mode. In response to the sensor sensing the position of the second arm at the predetermined position when the header is in the second operating mode, the sensor communicates with the controller to effect at least one of vertical and rotational movement of the header with respect to the ground.

The present invention further relates to a method for effecting at least one of vertical and rotational movement of a header for use with a vehicle when the header is in a second operating mode. The method includes providing a first arm pivotably secured to the header and configured to support a cutterbar, the first arm configured to move in response to encountering ground undulations when the header is in a first operating mode. A shaft has an axis and secured to the header, the shaft including a member outwardly extending from the shaft, the shaft extending substantially transverse to a direction of travel of the header. The shaft is configured to rotate about the axis in response to a portion of the member distal from the shaft being brought into abutting contact with the first arm when the header is in the first operating mode. The shaft is configured not to rotate about the axis when the header is in a second operating mode. A second arm is rotatably movable about the axis of the shaft, a surface of the second arm facing the ground is configured to encounter ground undulations when the header is in the second operating mode. A sensor is operatively connected to the second arm and to a controller, the sensor configured to sense when a position of the second arm is located at a predetermined position that is at least in close proximity of ground undulations when the header is in the second operating mode. The method further includes sensing the position of the second arm with the sensor and communicating with the controller by the sensor to effect the movement of the header with respect to the ground.

The present invention yet further relates to a kit for a crop harvesting header for use with a work vehicle, the kit includes a tube configurable to rotatably receive a shaft having an axis and secured to the header. The shaft includes a member outwardly extending from the shaft, the shaft extending substantially transverse to a direction of travel of the header. The shaft is configured to rotate about the axis in response to a portion of the member distal from the shaft being brought into abutting contact with a first arm when the header is in a first operating mode. The shaft is configured not to rotate about the axis when the header is in a second operating mode. The first arm is pivotably secured to the header and configured to support a cutterbar, and the first arm is configured to move in response to encountering ground undulations when the header is in the first operating mode. A second arm is rotatably movable about the axis of the shaft, a surface of the second arm facing the ground is configured to encounter ground undulations when the header is in the second operating mode. A sensor is operatively connected to the second arm and to a controller. The sensor is configured to sense when a position of the second arm is located at a predetermined position that is at least in close proximity of ground undulations when the header is in the second operating mode. Upon assembly of the kit to the header, in response to the sensor sensing the position of the second arm at the predetermined position when the header is in the second operating mode, the sensor electronically communicates with the controller to effect at least one of vertical and rotational movement of the header with respect to the ground.

An advantage of the present invention is control of the header when the header utilizes a rigid operating mode.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
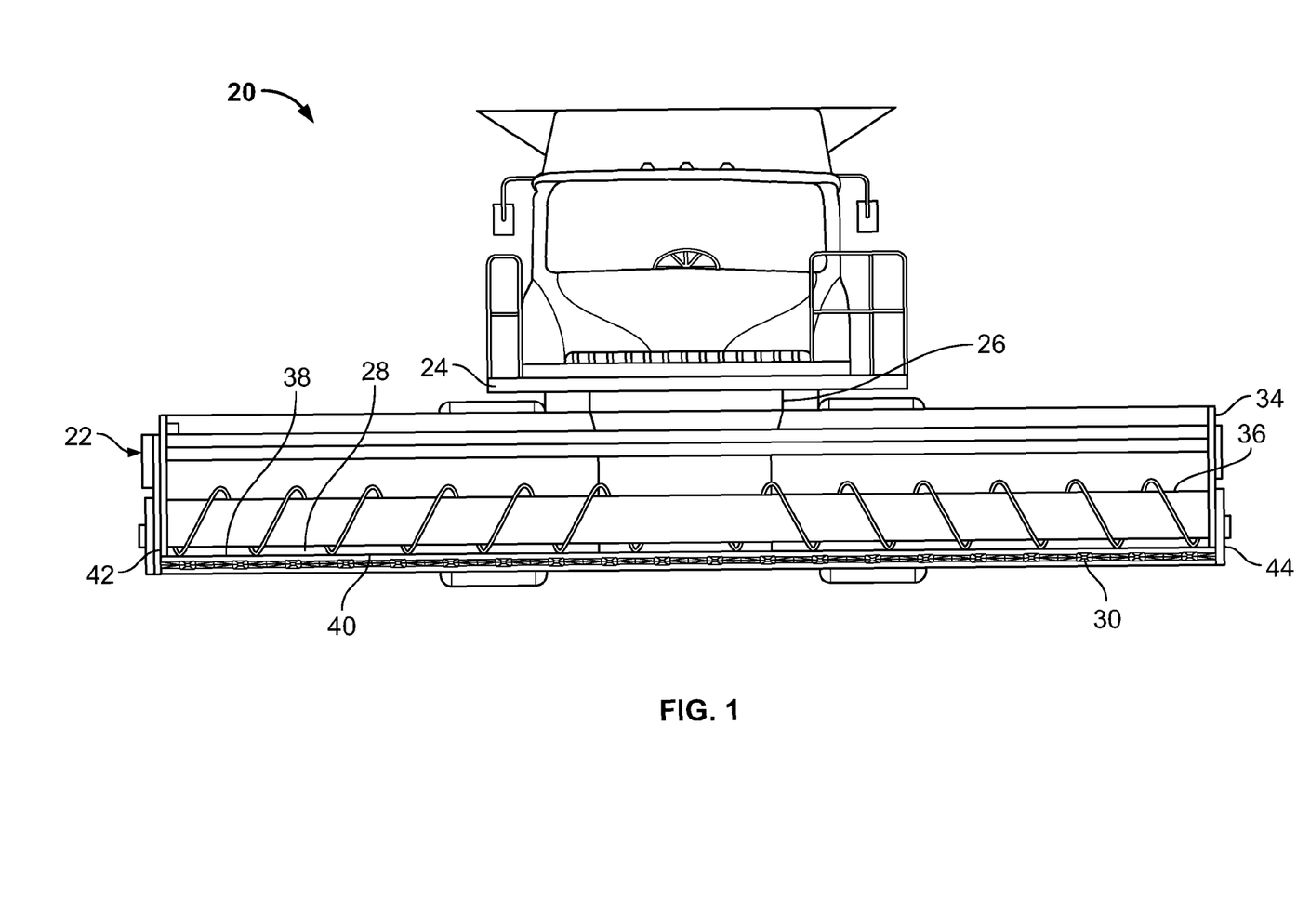
FIG. 1 is a front view of an embodiment of a crop harvesting device and harvesting header of the present invention.

A combine 20, which is a well-known agricultural cutting and harvesting machine also sometimes generally referred to as a work vehicle or work machine, is shown in FIG. 1. Combine 20 includes a header 22, which is configured to cut or sever crops, including (without limitation) small grains (e.g., wheat, soybeans), and to induct the cut or severed crops into a feeder 26. Both functions can be performed as combine 20 moves forward over a crop field.

Figure 2:
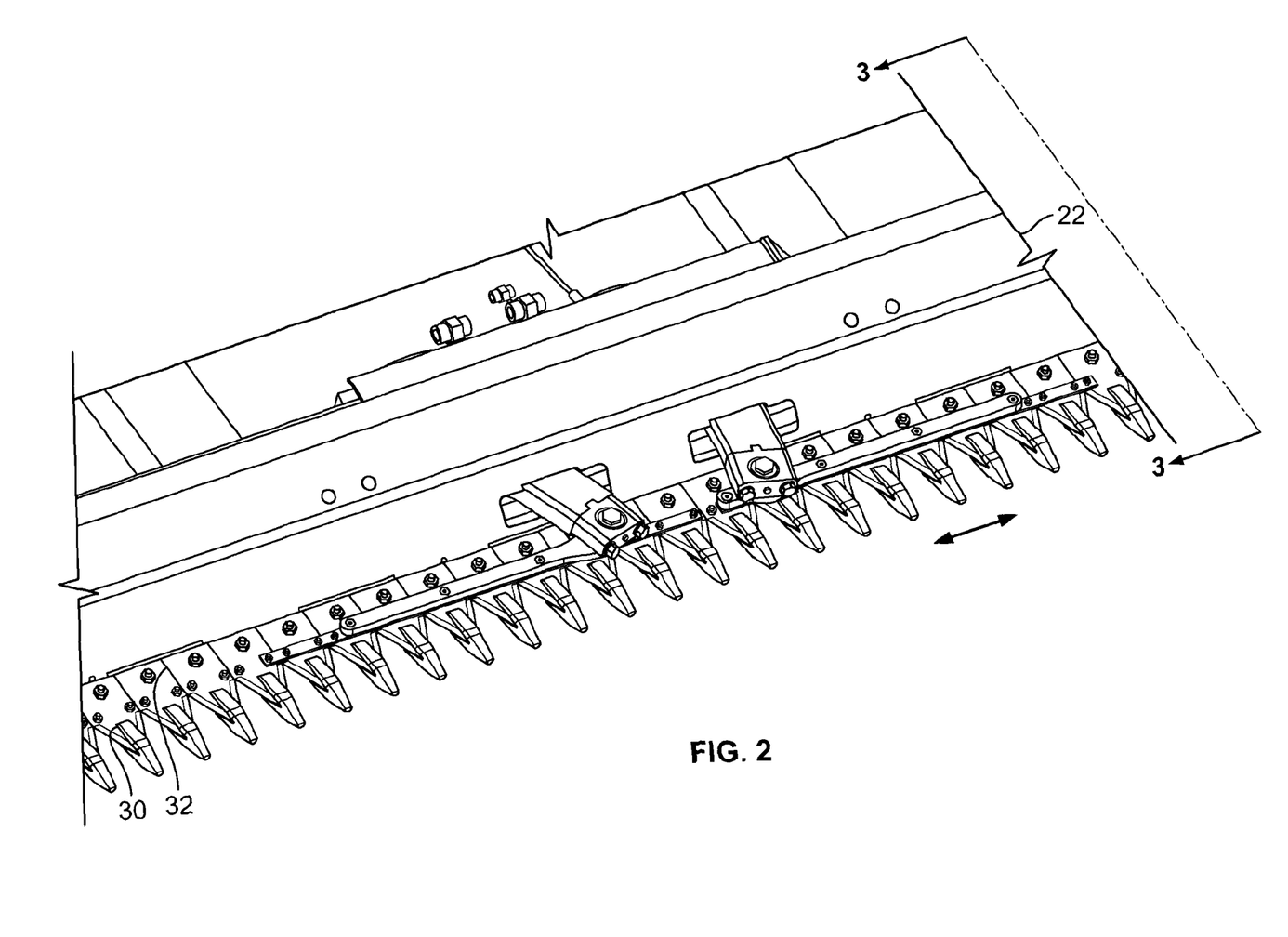
FIG. 2 is a top perspective view of the crop harvesting device of FIG. 1 of the present invention.

Header 22 is attached to a forward end 24 of combine 20 and includes a pan or floor 28 that is supported in desired proximity to the surface of a crop field. Header 22 includes an elongated sidewardly extending sickle 30 along a forward edge portion 32 (see FIG. 2) of floor 28. A cutter or sickle 30 is configured to cut or sever crops, in preparation for induction into a feeder 26. Additionally, header 22 may include an elongate, sidewardly extending reel 34 disposed above sickle 30. Reel 34 is rotatable in a direction suitable for facilitating the induction of cut or severed crops into feeder 26. Header 22 further includes an elongate, rotatable auger 36, which extends in close proximity to a top surface 38 of floor 28 and has helical flights therearound. Auger 36 is configured to cooperate with reel 34 in conveying cut or severed crops to feeder 26, which is configured to convey the cut or severed crops into combine 20 for threshing and cleaning. Alternatively, instead of rotatable auger 36, header 22 may include a draper header or other crop harvesting/gathering header.

Sickle 30 extends along a forward edge 40 of floor 28, and generally is bounded by a first side edge 42 and an opposing second side edge 44, both of floor 28. Sickle 30 is supported by a cutterbar 45 (see FIG. 3) which is likewise supported by a first portion 46 of an elongated member or first arm 48 that will be discussed in further detail below. During operation, sickle 30 reciprocates rapidly to effect a cutting or severing action that cuts or severs plant stems, stalks or other material present between the blades of the sickle. As denoted by arrow 50, the sickle blades can reciprocate sideways.

Figure 3:
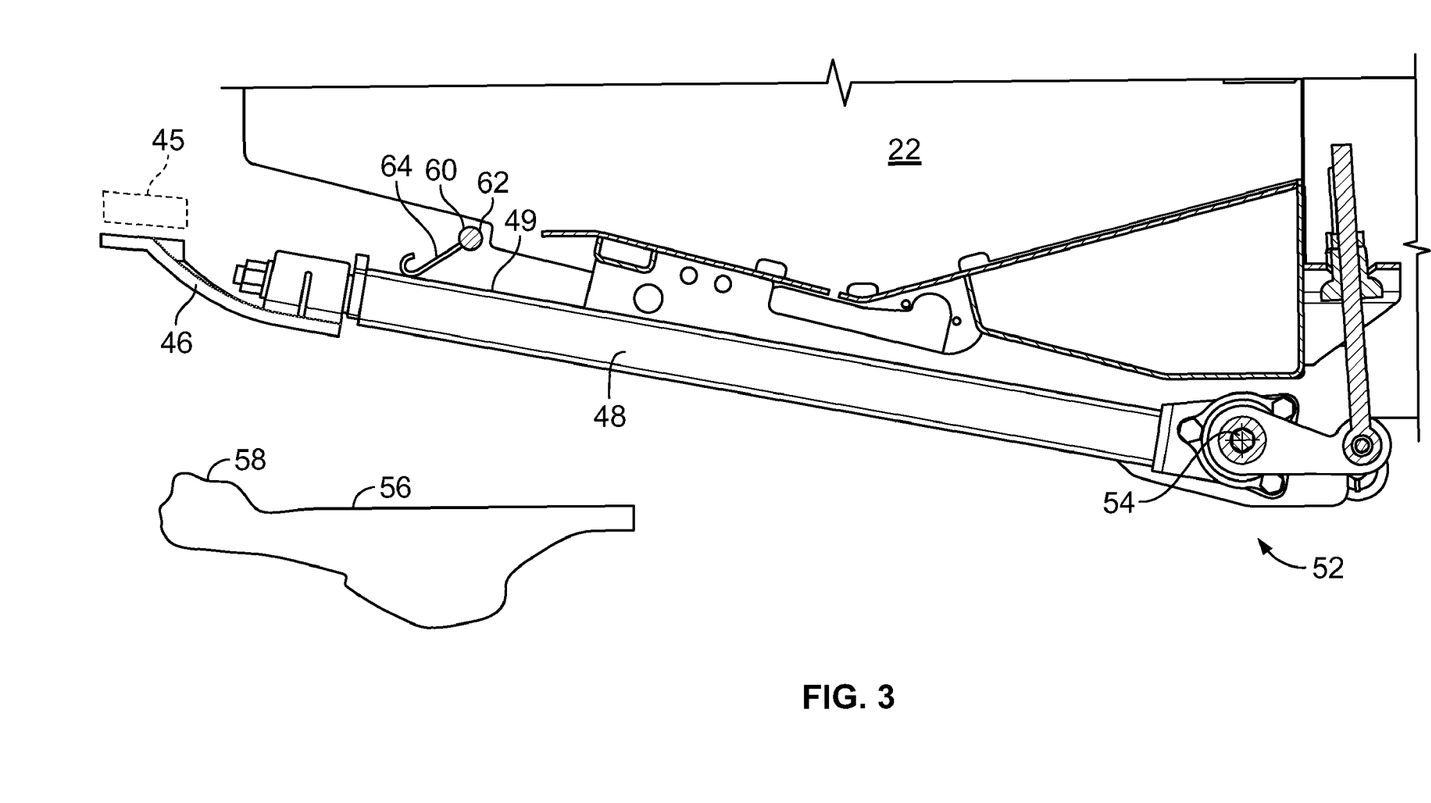
FIG. 3 is a cross section taken along line 3-3 of the present invention.

Referring to FIG. 3, the operation of first arm 48 is now discussed. One end of first arm 48 rotates about an axis 54 that is distal from cutterbar 45, which axis extends substantially perpendicular to the direction of travel of header 22. An adjustment assembly 52 provides an adjustable amount of torque about axis 54, providing substantially uniform support of cutterbar 45 along its length. The operation of adjustment assembly 52 is disclosed in further detail in Applicant's pending application Ser. No. 12/748,550 titled "Cutterbar Support For A Crop Harvesting Header", which is incorporated by reference herein in its entirety. First arm 48, when operating or being utilized in a first operating mode, also commonly referred to as flex mode permits the first arm to move in response to encountering ground undulations 58, such as when harvesting crops that require cutterbar 45 to be in close proximity with the ground. In other words, the first operating mode or flex mode permits a surface of first arm 48 that faces the ground 56 to rotate upwardly or in a clockwise direction about axis 54 in response to the first arm encountering an upwardly extending ground undulation 58, greatly reducing the opportunity for damage to the cutterbar.

As further shown in FIG. 3, a shaft 60 having an axis 62 is rotatably secured by header 22. Shaft 60 extends substantially transverse to a direction of travel of header 22. A finger or member 64 extends outwardly from shaft 60, the member being in alignment with a corresponding first arm 48. That is, in the first operating mode or flex mode of the header, in response to first arm 48 being sufficiently rotated about axis 54 toward shaft 60, surface 49 of the first arm is brought into contact with member 64. Upon further rotation of first arm 48 toward shaft 60, member 64 is urged into rotational movement about axis 62 of the shaft and similarly urging shaft 60 to rotate about axis 62. As a result of sufficient rotational movement of shaft 60 about axis 62, a controller (not shown in FIG. 3) controls a movement of header 22, such as in a vertical direction. In one embodiment, shaft 60 may extend at least a significant distance transverse to the direction of travel of header 22, possibly spanning the width of the header, and the shaft may include a plurality of members 64 distributed along the shaft and each corresponding to a respective first arm 48. In a further embodiment, shaft 60 may be divided into several portions, each of which being in communication with a controller, permitting movement of the header in the at least one of a vertical and a rotational movement of the header with respect to the ground.

In contrast to the first operating mode or flex mode of the header, the second operating mode or rigid mode of the header involves, as the name implies, collectively maintaining the first arms 48 in a rigid position during operation of the combine in the second operating mode or rigid mode. In one embodiment, the second operating mode or rigid mode of the header is achieved by preventing first arms 48 from rotating about axis 54, such as by securing members first arms 48 to a portion of header 22 to prevent shaft 60 from rotating. Formerly, in a conventional combine construction utilizing the combine in the second operating mode or rigid mode, independent control of the position of the header in the rigid or fixed position has been limited to manual adjustment by the operator, subjecting the operator to an elevated level of stress, fatigue and other undesirable results.

Figure 4:
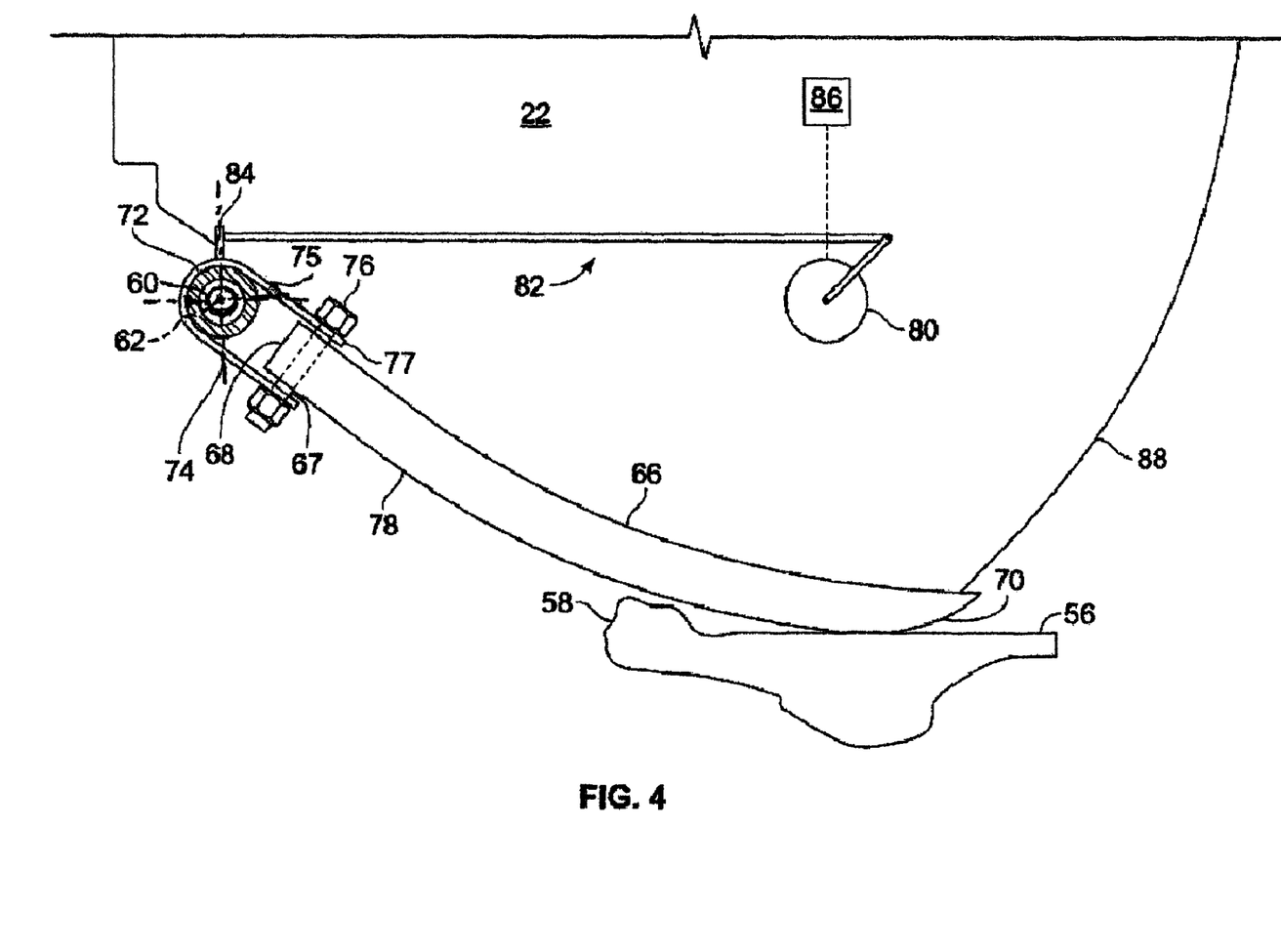
FIG. 4 is a cross section taken along line 3-3 of the present invention.
Figure 5:
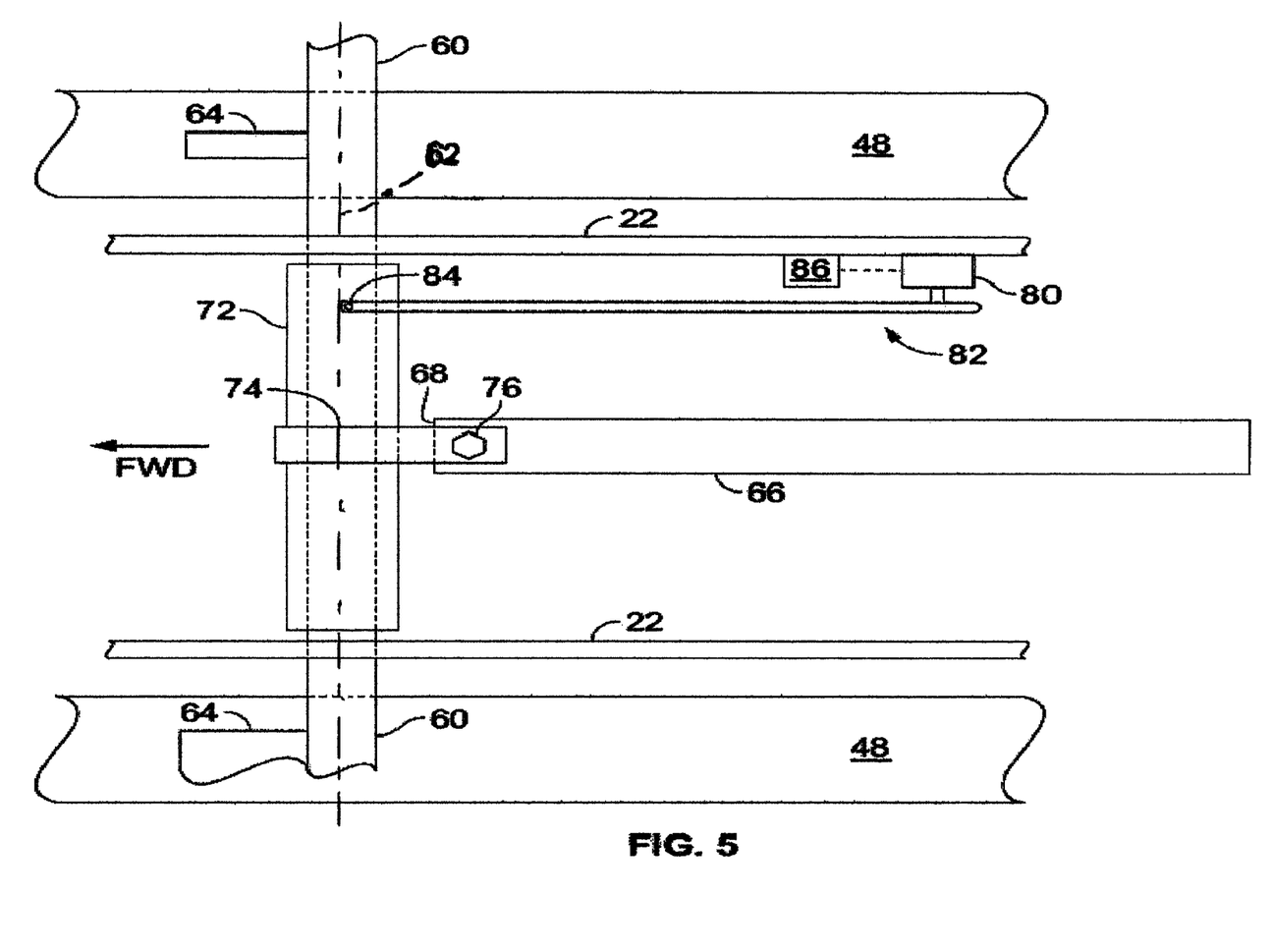
FIG. 5 is a plan view of a control system of the present invention.

FIGS. 4-5 show additional components of the header control system that provide automatic control of the header position while the header is being utilized in a second operating mode or rigid mode. Although components shown in FIG. 4 operate in relation to shaft 60, for purposes of clarity, those components were not previously shown in FIG. 3, but the components shown in each of FIGS. 3 and 4 are shown together in FIG. 5, which is a plan view of a portion of the header containing components shown in FIGS. 3-4. Surrounding shaft 60 is a tube 72 that is configured to rotatably receive shaft 60. That is, tube 72 is configured to substantially freely rotate about axis 62 of shaft 60. A clamp 74, such as a C-shaped clamp, is installed over the outside surface of tube 72. Once installed, opposed walls 75 extend around tube 72 with openings 77 formed in the walls being configured to receive a fastener 76 that extends through the openings and is secured to the clamp by the fastener. Although tube 72 is configured to rotate about axis 62 of shaft 60, clamp 74 is intended to be secured or affixed to tube 72 so that clamp 74 does not rotate with respect to tube 72.

An elongated feeler arm or second arm 66 includes a first end 68 and an opposed second end 70. Second arm 66 includes an aperture 67 that is configured to receive fastener 76 and to be positioned between the opposed walls 75 of clamp 74 to rotatably secure the second arm 66 with respect to tube 72. Near second end 70 is a flexible member 88, such as a chain, that secures second end 70 to header 22, permitting end 70 to be brought toward the header (and away from the ground) when the combine is operated in the first operating mode or flex mode. However, since the second arm 66 is secured within clamp 74, second arm 66 does not rotate with respect to tube 72. Second arm 66 further includes a surface 78 that faces the ground 56 when secured by clamp 74 and is configured to encounter ground undulations 58 in response to the second arm being moved over the ground. That is, in response to surface 78 of second arm 66 encountering ground undulations 58, the second arm rotates about axis 62 of shaft 60. As shown, the arrangement of fastener 76 permits second arm 66 to pivot in response to a change of direction of the combine, e.g., the combine executing a turn. A linkage 82 is also connected at one end, such as by a fastener 84 to tube 72. As shown, fastener 84 permits rotational movement between of linkage 82 with respect to tube 72, such as may occur during a change of direction of the combine, e.g., the combine executing a turn. Fastener 84 provides a substantially non-flexing rotational movement of linkage 82 with respect to the ground 56. Linkage 82 extends from one end near tube 72 to an opposed end associated with a sensor 80, such as a potentiometer that is operatively connected to a controller 86. Other types of sensors may include, but are not limited to, limit switches and Hall effect sensors, although mechanical sensors may also be utilized. As shown, sensor 80, which is affixed to the header, is operatively connected to second arm 66 by linkage 82 and is also operatively connected to controller 86 to permit sensor 80 to sense the position of second arm 66.

When the header is utilized in a second operating mode, in which shaft 60 is prevented from rotating about axis 62, in response to surface 78 of second arm 66 encountering ground undulation 58 (in this instance a raised ground undulation with respect to the vertical elevation of the surrounding ground), second arm 66 rotates about axis 62 in a counterclockwise direction. Second arm 66 likewise urges tube 72 as well as linkage 82 to each rotate in a counterclockwise direction about axis 62. By virtue of the operative connections, linkage 82 imparts a rotational movement associated with the connection between linkage 82 and sensor 80. The rotational movement changes the voltage of sensor 80. Upon the voltage of sensor 80 achieving or exceeding a predetermined value, the magnitude of the voltage being monitored by controller 86 by virtue of the operative connection between the sensor and the controller as is well known, the position of the header is shifted or moved in at least one of a vertical direction and a rotational direction about an axis that is substantially parallel to the direction of travel of the header.

It is to be understood that a kit can be constructed to retrofit an existing combine to permit header control as previously discussed. Since member 64 may be permanently secured to shaft 60, such as by welding, in order to permit the installation of multiple tubes 72, each of the tubes may composed of tube portions, such as two or more tube portions, that may be brought together to receive the shaft prior to assembly of the tube portions. In one embodiment, the two or more tube portions may be secured together in a manner that permits convenient disassembly, such as using mechanical fasteners. In one embodiment, a kit could comprise tube 72 or tube portions to form at least one tube 72, second arm 66, clamp 74, fasteners 76, linkage 82, fastener 84 sensor 80 and controller 86, including sufficient electrical wiring as required. In a further embodiment, controller 86 may already be included in an existing combine configuration. Of course, multiple components of at least tube 72, second arm 66, clamp 74, fastener 76, linkage 82, fastener 84 and sensor 80 (and possibly controller 86) may be desirable for other kit configurations.

It is to be understood that other arrangements between the sensor and the controller may be used, that multiple sensors may be utilized, and that the sensor may operate utilizing different principles of operation to achieve the desired results. For example, the sensor may be a potentiometer, but may alternately utilize optics or other mechanical or electro-mechanical principles of operation. That is, the operative connection between the sensor and the controller may be electrical and/or mechanical, so long as the header control (vertical and/or rotational movement) is automatically achieved while the header is utilized in the second operating mode or rigid mode.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A crop harvesting header for use with a work vehicle, the header comprising:
   a first arm pivotably secured to the header and configured to support a cutterbar, the first arm configured to move in response to encountering ground undulations when the header is in a first operating mode;
   a shaft having an axis and secured to the header, the shaft including a member outwardly extending from the shaft, the shaft extending substantially transverse to a longitudinal direction of travel of the header, the shaft being configured to rotate about the axis in response to a portion of the member distal from the shaft being brought into abutting contact with the first arm when the header is in the first operating mode;
   a second arm rotatably movable about the axis of the shaft, a surface of the second arm facing the ground is configured to encounter ground undulations when the header is in a second operating mode,
   wherein a leading end of the first arm and a leading end of the second arm are each positioned adjacent to the shaft and the first and second arms extend substantially in the direction of travel of the header; and
   a sensor operatively connected to the second arm and to a controller, the sensor configured to sense when a position of the second arm is located at a predetermined position that is at least in close proximity of ground undulations when the header is in the second operating mode;

in response to the sensor sensing the position of the second arm at the predetermined position when the header is in the second operating mode, the sensor communicates with the controller to effect at least one of vertical and rotational movement of the header with respect to the ground.

2. The header of claim 1, wherein the controller is in electronic communication with the sensor.

3. The header of claim 1, wherein the second arm is secured to a tube that rotatably receives the shaft.

4. The header of claim 3, wherein the sensor is secured to the tube.

5. The header of claim 4, wherein the sensor is secured at a predetermined position on the header.

6. The header of claim 5, wherein the sensor is a potentiometer.

7. The header of claim 5, wherein the sensor is selected from the group consisting of: potentiometers, limit switches, and Hall effect sensors.

8. The header of claim 1, wherein the first arm and the second arm are spaced-apart and positioned substantially side-by-side.

9. The header of claim 1, wherein when the header is in the first operating mode, the header is permitted to move.

10. The header of claim 1, wherein when the header is in the second operating mode, the header is held in a rigid position during operation of the work vehicle.

11. A kit for a crop harvesting header for use with a work vehicle, the header comprising a first arm pivotably secured to the header and configured to support a cutterbar, the first arm configured to move in response to encountering ground undulations when the header is in a first operating mode, the header including a shaft having an axis and secured to the header, the shaft extending substantially transverse to a longitudinal direction of travel of the header, the shaft configured to rotate about the axis in response to a portion of the shaft being brought into abutting contact with the first arm when the header is in the first operating mode, the kit comprising:
   a tube configured to be movably positioned over an outer perimeter of the shaft, the tube configured to rotate about the shaft;
   a second arm including a leading end configured to be operably connected to the tube and to extend therefrom, the second arm configured to rotatably move about at least a portion of the shaft, the second arm having a surface configured to encounter ground undulations when the header is in a second operating mode; and
   a sensor configured to be operatively connected to the second arm, the sensor when operably connected configured to sense when a position of the second arm is located at a predetermined position that is at least in close proximity of ground undulations when the header is in the second operating mode, such that the sensor, when operably connected to the second arm, and in response to sensing the position of the second arm at the predetermined position when the header is in the second operating mode, is configured to provide electronic communication to effect at least one of vertical and rotational movement of the header with respect to the ground,
   wherein when the leading end of the second arm is operably connected to the tube, a leading end of the first arm and the leading end of the second arm are each positioned adjacent to the shaft and the first and second arms extend substantially in the direction of travel of the header.

12. The kit of claim 11, wherein the tube comprises at least two portions that are brought together to receive the shaft.

13. The kit of claim 12, wherein the tube may be disassembled to separate the at least two portions after assembly of the tube.

14. The kit of claim 11, wherein the sensor is secured to the tube.

15. The kit of claim 11, wherein the sensor is secured at a predetermined position adjacent to the tube.

16. The kit of claim 15, wherein the sensor is a potentiometer.

17. The kit of claim 11, wherein the kit further comprises a controller, and the sensor communicates with the controller which effects the at least one of vertical and rotational movement of the header with respect to the ground.

18. A crop harvesting header for use with a work vehicle, the header comprising:
   a first arm pivotably secured to the header and configured to support a cutterbar, the first arm configured to move in response to encountering ground undulations when the header is in a first operating mode;
   a shaft having an axis and secured to the header, the shaft including a member outwardly extending from the shaft, the shaft extending substantially transverse to a longitudinal direction of travel of the header, the shaft being configured to rotate about the axis in response to a portion of the member distal from the shaft being brought into abutting contact with the first arm when the header is in the first operating mode;
   a second arm rotatably movable about the axis of the shaft, a surface of the second arm facing the ground is configured to encounter ground undulations when the header is in a second operating mode,
   wherein a leading end of the first arm and a leading end of the second arm are each positioned adjacent to the shaft and the first and second arms extend substantially in the direction of travel of the header; and
   a sensor operatively connected to the second arm, the sensor configured to sense when a position of the second arm is located at a predetermined position that is at least in close proximity of ground undulations when the header is in the second operating mode;
   in response to the sensor sensing the position of the second arm at the predetermined position when the header is in the second operating mode, the sensor communicates to effect at least one of vertical and rotational movement of the header with respect to the ground.

* * * * *